(12) United States Patent
Cao et al.

(10) Patent No.: US 6,425,982 B1
(45) Date of Patent: Jul. 30, 2002

(54) SYSTEM FOR REMOVING BLEED-THROUGHS FROM OLD CORRUGATED CONTAINER FIBER PULP

(75) Inventors: Bangji Cao, Appleton; Oliver U. Heise, Menasha, both of WI (US)

(73) Assignee: Voith Paper, Inc., Appleton, WI (US)

( * ) Notice: Subject to any disclaimer, the term of this patent is extended or adjusted under 35 U.S.C. 154(b) by 0 days.

(21) Appl. No.: 09/800,031

(22) Filed: Mar. 6, 2001

(51) Int. Cl.[7] .............................. D21B 1/12; B03D 1/02
(52) U.S. Cl. ........................ 162/264; 162/4; 209/168; 209/729; 210/703
(58) Field of Search .............................. 162/4, 29, 189, 162/35, 264; 209/168, 728, 729, 170; 210/703

(56) References Cited

U.S. PATENT DOCUMENTS

| | | | |
|---|---|---|---|
| 4,326,912 A | 4/1982 | Mollett | 162/5 |
| 4,336,136 A | * 6/1982 | Giguere | 210/178 |
| 4,424,081 A | * 1/1984 | Giguere | 134/10 |
| 5,131,980 A | 7/1992 | Chamblee et al. | 162/4 |
| 5,302,245 A | 4/1994 | Nadeau | 162/8 |
| 5,377,844 A | 1/1995 | Hwang | 209/167 |
| 5,639,346 A | 6/1997 | Marwah et al. | 162/5 |
| 5,707,489 A | 1/1998 | Von Grumbkow et al. | 162/4 |
| 5,744,043 A | 4/1998 | Cutts et al. | 210/705 |
| 5,855,769 A | 1/1999 | Firth et al. | 209/164 |
| 5,985,095 A | 11/1999 | Scholz | 162/5 |
| 6,174,434 B1 | * 1/2001 | Krofta | 210/221.2 |

FOREIGN PATENT DOCUMENTS

| | | | |
|---|---|---|---|
| DE | 4130472 | * 9/1991 | |
| EP | 0 632 158 A1 | 6/1994 | D21C/5/02 |

* cited by examiner

*Primary Examiner*—Dean T. Nguyen
(74) *Attorney, Agent, or Firm*—Taylor & Aust, P.C.

(57) ABSTRACT

A system for removing bleed-through contaminants from OCC fiber pulp includes a plurality of primary flotation cells, with each primary flotation cell having an inlet, an accept outlet and a reject outlet. The inlet and the accept outlets of the plurality of primary flotation cells are coupled together in a series configuration. The reject outlets are coupled together in parallel. A secondary flotation cell has an inlet, at least one accept outlet and a reject outlet. The secondary flotation cell inlet is fluidly coupled with the reject outlet of the primary flotation cells. A water clarifier has an inlet, a clarified water outlet and a sludge outlet. The inlet is connected with the reject outlet of the secondary flotation cell.

11 Claims, 1 Drawing Sheet

SYSTEM FOR REMOVING BLEED-THROUGHS FROM OLD CORRUGATED CONTAINER FIBER PULP

BACKGROUND OF THE INVENTION

1. Field of the Invention

The present invention relates to a method of processing fiber pulp used to make paper products, and, more particularly, to a method of removing bleedthroughs from fiber pulp used to make paper products.

2. Description of the Related Art

The use of old corrugated container (OCC) for making new containerboard increased rapidly in the 1980s and early 1990s. According to American Forest and Paper Association, the recycling rate of OCC, defined as the ratio of the tonnage of OCC grade fiber used at paper and paperboard mills to that of total containerboard supply, increased from 39.5% in 1987 to 63.4% in 1996. Since then, the recycling rate has stabilized around 63.5%.

At such high recycling rates, removal of contaminants from OCC becomes crucial to assure quality standards of the product made from OCC fiber. Currently, the standard process to recycle OCC consists of a pulper, detrasher, high-density cleaner, coarse screen, forward cleaner, fine screen, reverse or through-flow cleaner and thickener. Though the majority of contaminants can be removed by such a processing sequence, many fine contaminant particles remain in the processed pulp. These fine particles may either be brought in by the contaminated OCC or generated by the fragmentation of larger particles during the treatment. Tests on some fine screen accepts indicate that the size of these fine contaminants ranges from 80 $\mu$m to 750 $\mu$m in equivalent diameter, with an average of about 170 $\mu$m. Therefore, the majority of them can easily pass through 0.20 mm (200 $\mu$m) slotted screen baskets, which is used in most OCC recycle mill fine screen systems. Many large particles are also able to pass through the screen baskets due to their shape or flexibility. Reverse and through-flow cleaners are also proven to be ineffective to remove these contaminants since the specific density of "bleed-throughs" are close to 1 and their size is too small to create enough drag forces to differentiate them from fibers.

The failure of removing these fine contaminants, together with the increasing usage of OCC, has caused deterioration of pulp qualities. The greatest concern is the formation of objectionable "bleed-throughs" in dried paperboard. These "bleed-throughts" are formed through melting of fine contaminants. At the elevated temperature (approximately 350° F.) of a paper machine dryer section, most of these contaminants will melt and migrate into voids of the fiber web. At the spot where the contaminant occupies, a dark bleed-through is formed and it gives the finished paperboard an objectionable appearance. In peak times, the concentration of "bleed-throughs" in paper sheets, tested with an image analyzer, reaches 50,000 ppm, that is, 5% of total sheet area is covered with dark "bleed-throughs". The "bleed-throughs" could also cause problems in converting operations, such as brown tissue embossing and gypsum-board making.

The worst situation occurs in mills using 100% recycled fiber. In these mills, each time the OCC is recycled, it brings in more contaminants, they will accumulate over years until the pulp becomes finally unsuitable for making new paper products.

What is needed in the art is a method of effectively removing bleed-through contaminants form OCC fiber pulp.

SUMMARY OF THE INVENTION

The present invention provides a system for removing bleed-through contaminants from OCC fiber pulp, including a plurality of series arranged primary flotation cells with respective reject outlets which are combined in parallel and coupled with one or more secondary flotation cells and a water clarifier.

The invention comprises, in one form thereof, a system for removing bleed-through contaminants from OCC fiber pulp. A plurality of primary flotation cells are provided with each primary flotation cell having an inlet, an accept outlet and a reject outlet. The inlet and the accept outlets of the plurality of primary flotation cells are coupled together in a series configuration. The reject outlets are coupled together in parallel. A secondary flotation cell has an inlet, at least one accept outlet and a reject outlet. The secondary flotation cell inlet is fluidly coupled with the reject outlet of the primary flotation cells. A water clarifier has an inlet, a clarified water outlet and a sludge outlet. The inlet is connected with the reject outlet of the upstream secondary flotation cell.

An advantage of the present invention is that fine contaminants causing bleed-through flaws in a fiber web are removed from the OCC fiber pulp.

Another advantage is that fibers from the contaminant laden rejects discharged from the primary flotation cells are further processed within one or more secondary flotation cells to remove the fibers for use.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, which is a schematic illustration of an embodiment of a system of the present invention for removing bleed-through contaminants from OCC fiber pulp. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
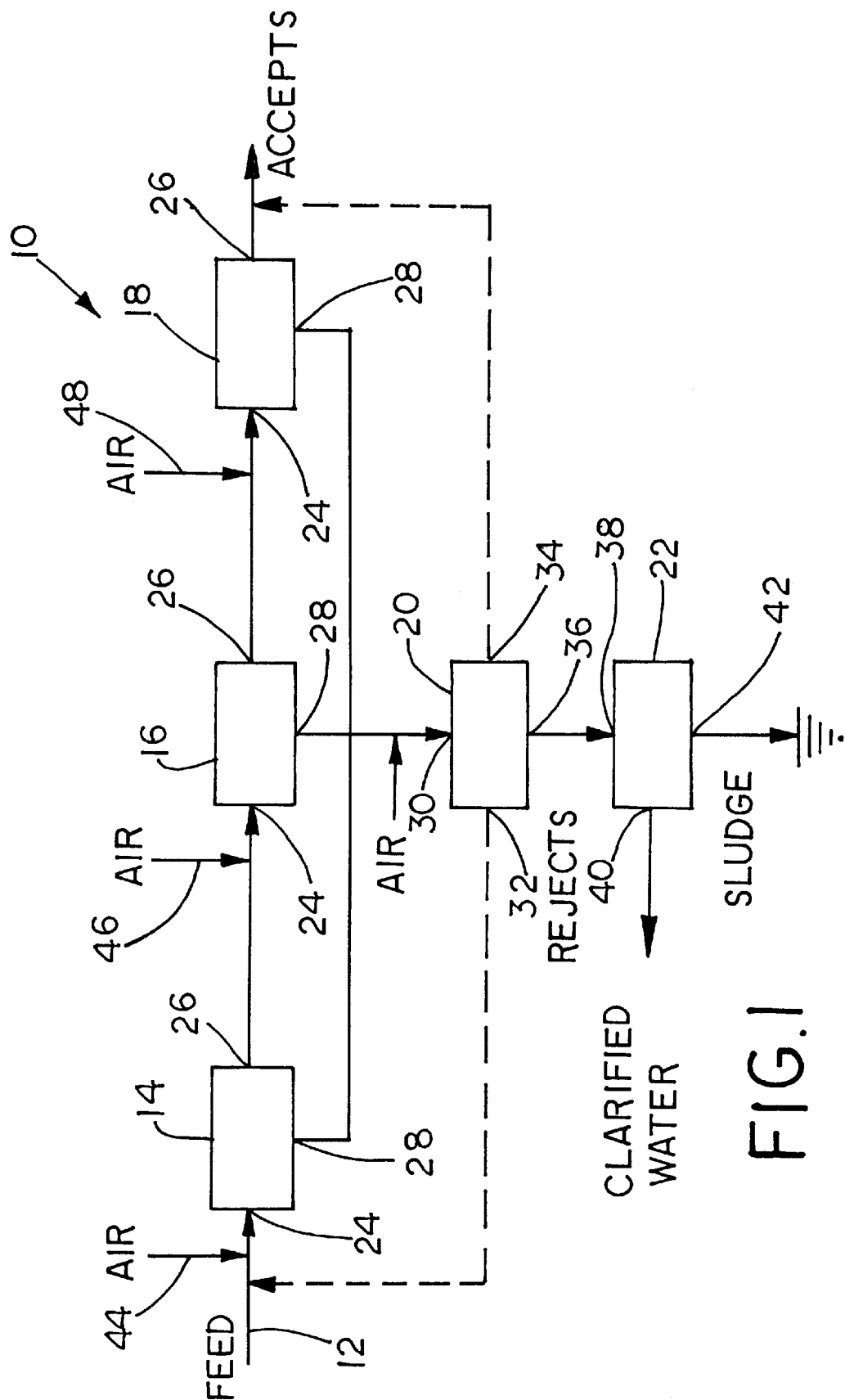

Referring now to the drawing, there is shown an embodiment of a system 10 for removing bleed-through contaminants from OCC fiber pulp, designated by feed line 12. System 10 generally includes a plurality of primary flotation cells 14, 16 and 18, a secondary floatation cell 20 and a water clarifier 22.

The plurality of primary flotation cells 14, 16 and 18 include upstream primary flotation cell 14, intermediate primary flotation cell 16 and downstream primary flotation cell 18. The exact number of primary flotation cells may vary depending upon the application, with three primary flotation cells being preferred as shown in the drawing. Each primary flotation cell 14, 16 and 18 includes an inlet 24, an accept outlet 26 and a reject outlet 28. Inlet 24 of upstream primary flotation cell 14 is coupled with feed line 12 and receives OCC fiber pulp from feed line 12. Accept outlet 26 of downstream primary flotation cell 18 provides accepts to other suitable processing equipment downstream therefrom. Upstream primary flotation cell 14, intermediate primary flotation cell 16 and downstream primary flotation cell 18 are coupled together in a series configuration. More particularly, accept outlet 26 of upstream primary flotation cell 14 is coupled with inlet 24 of intermediate primary flotation cell 16, and accept outlet 26 of intermediate primary flotation cell 16 is coupled with inlet 24 of downstream primary flotation cell 18.

Reject outlets 28 from each of upstream primary flotation cells 14, intermediate primary flotation cells 16 and downstream primary flotation cell 18 are coupled together in parallel as shown to provide a single source of rejects from primary flotation cells 14, 16 and 18.

At least one secondary flotation cell 20 is coupled in parallel with reject outlets 28 from primary flotation cells 14, 16 and 18. In the embodiment shown, a single secondary flotation cell 20 is provided. However, more than one secondary flotation cell may be provided depending upon the particular application. In the event that a plurality of secondary flotation cells are provided, they are coupled together in a series manner.

Secondary flotation cell 20 includes an inlet 30, a pair of accept outlets 32, 34 and a reject outlet 36. Inlet 30 receives the rejects from the parallel combined reject outlets 28 from primary flotation cells 14, 16 and 18. Accept outlet 32 is coupled with feed line 12 to feed accepts to the upstream end of primary flotation cells 14, 16 and 18. Accept outlet 34 is coupled with accept outlet 26 of downstream primary flotation cell 14 to provide accepts for further processing and/or use downstream from primary flotation cells 14, 16 and 18. Each of accept outlets 32, 34 may be utilized, or only a single accept outlet 32, 34 may be utilized, depending upon the particular application. Hence, the fluid lines from accept outlets 32, 34 are shown in dash lines rather than solid lines.

Water clarifier 22 includes an inlet 38, clarified water outlet 40 and sludge outlet 42. Inlet 38 is coupled with reject outlet 36 from secondary flotation cell 20.

Traditional flotation cells (e.g. Voith EcoCell, Compact Flotation Cell, etc.) used for deinking of printed wastepaper (e.g. sorted office waste, old newsprint, old magazine, etc.) can be modified for the application of OCC pulp. However, there are fundamental differences between flotation of printed wastepaper and old corrugated container.

A deinking system consists of the following stages, each of them is an integral part of the system: a) ink-fiber separation; b) ink particle agglomeration; c) ink/air bubble collision and cohesion; d) ink transportation through pulp suspension; e) foam generation and ink removal from suspension; f) washing and thickening. For the purpose of ink-fiber separation, a caustic is required to react with oil-based vehicles and breaks them down to form a soap and alcohol through a saponification reaction. The alkali also swells the pulp fibers and helps to detach the ink layer from the fiber surface. Often hydrogen peroxide is added to counter the alkaline yellowing effect, and sodium silicate is added as a peroxide stabilizer and pH buffer. Once the ink particles are released from fibers, they are covered with a layer of sodium soap molecules that have their hydrophilic ends towards water. This layer prevents ink particles from redeposit on fibers. In order for agglomeration of ink particles and attachment to air bubbles, the ink particles need to be rendered hydrophobic. This is achieved by adding sufficient calcium ions in the water to react with the soap and produce the insoluble hydrophobic calcium floc. In flotation of laser or xerographic inks, synthetic surfactant provides the function of both dispersant and collector.

As is apparent, flotation deinking of printed wastepaper requires delicate and sophisticated control of chemistry to achieve decent removal efficiency. The present invention avoids all aspects of chemistry control during the flotation of OCC pulp, (i.e., it is not necessary to add any chemicals for flotation of OCC pulp). The simplification arises from two facts: a) the targeted fine contaminants in OCC pulp are dispersed in the water after repulping and are hydrophobic by themselves; and b) OCC pulp contains a substantial amount of residual fatty acid esters that help to create sufficient foam to remove "bleed-throughs." Fatty acids and fatty acid esters are known to exist in parenchyma cells and resin canals of southern pine, which is the dominate raw material used in making virgin linerboard and corrugated medium. Some parenchyma cells will survive the harsh chemical pulping process, especially during high-yield kraft pulping. The simplicity of OCC flotation greatly reduces the operation cost and makes it economically feasible for paperboard manufacture.

The pulp made from printed wastepaper and old corrugated container has very different properties that determine the process parameters of the flotation. The printed wastepaper contains either fully bleached fibers that are very flexible, or mechanical fibers that are very short and fine. In contrast, OCC fibers are very coarse and long, causing high friction in flow. In addition, OCC pulp contains little mineral filler while printed wastepaper contain 10–30% mineral filler that can significantly reduce the friction among flowing fibers. Furthermore, the targeted fine contaminants in OCC pulp have very low concentration, usually less that 0.5% by weight, while in printed wastepaper the ink concentration is as high as 4% by weight. The substantial difference in their fluidity and contaminant level requires a different flotation treatment for OCC pulp from the conventional flotation that is designed for printed wastepaper. The froth flotation process is carried out for OCC pulp preferably at 0.5 to 1.3% consistency (fiber concentration) of feed pulp and 110 to 140° F.

The two-staged flotation system of the present invention is required for the efficient and economical removal of "bleed-throughs." As the accept pulp from primary flotation cells 14, 16 and 18 is sent to process module, its rejects are sent to secondary flotation cell 20 for further treatment. The accept pulp of secondary flotation is sent to the feed or accept pulp of primary flotation. The reject of secondary flotation is subsequently sent to water clarifier 22 and disposed as mill sludge. The primary stage is to achieve high removal efficiency and the secondary stage is to minimize the fiber loss. The key step of a successful flotation system is the secondary flotation because it determines the overall system efficiency and yield. Unlike the two-stage flotation system disclosed in the present invention, a single stage flotation system cannot be used for "bleed-through" removal, because the fiber loss is too high to make it economically feasible. For example, when a single stage flotation system is used for fractionation, which separates the fines fraction from the long fibers fraction, it does not require secondary flotation cells. In a single-stage flotation system the fines fraction and/or long fiber fraction will be treated and eventually be combined with each other; therefore, there is no mass removed from the system. The primary flotation of the present invention is carried out at 40–80% air injection by volume and 10–20% reject rate by weight, and the secondary flotation is carried out at 20–40% air injection by volume and 20–40% reject rate by weight.

The two-stage flotation system of the present invention is used in OCC recycling plants to replace Gyro-Cleaners, reverse cleaners, and through-flow cleaners. These cleaners have long been used for removal of lightweight contaminants but their efficiency has never been confirmed because of lack of a test method. Measured with the test method described in this invention, it is confirmed that the above cleaners give very low "bleed-through" removal efficiency (less than 40%).

During use, OCC fiber pulp is pumped to upstream primary flotation cell 14 through feed line 12. Air is injected into the fiber pulp within feed line 12 as indicated by line 44 and/or may be injected into upstream primary flotation cell 14. Inside upstream primary flotation cell 14, as air bubbles rise to the surface of the fiber pulp, they preferably collect fine contaminants and cellulosic fines and become contaminant laden foam. At the surface of the fiber pulp, the foam overflows to a reject trough and is discharged from reject outlet 28. The accepts fiber pulp of upstream primary flotation cell 14 is then pumped to intermediate primary flotation cell 16. Air is again injected into the fiber pulp as indicated by line 46 and/or may be directly injected into intermediate primary flotation cell 16. Fine contaminants and cellulosic fines are removed at reject outlet 28, as described above with respect to upstream primary flotation cell 14. The floated fiber pulp of intermediate primary flotation cell 16 is subsequently pumped to downstream primary flotation cell 18. Air is again injected into the fiber pulp as indicated by line 48 and/or may be directly injected into downstream primary flotation cell 18. Accepts from downstream primary flotation cell 18 are discharged from accept outlet 26 for further use and/or processing. Rejects are transported from reject outlet 28 and combined in a parallel manner with the rejects from upstream primary flotation cell 14 and intermediate primary flotation cell 16 as is apparent from the drawing. The total number of primary flotation cells is a compromise between quality and yield. The preferred number of cells ranges from three to five, with the embodiment shown in the drawing illustrating three primary flotation cells.

The combined rejects from primary flotation cells 14, 16 and 18 are fed to secondary flotation cell 20. A single secondary flotation cell may be provided as shown, or multiple secondary flotation cells connected together in series may be provided. Secondary flotation cell 20 functions to recover fibers from rejects transported from primary flotation cells 14, 16 and 18 that also contain concentrated contaminants. Within secondary flotation cell 20, fine contaminants are removed in the same way as primary flotation cells 14, 16 and 18, but at a much higher reject rate. The accepts from secondary flotation cell 20 are combined with feed line 12 via accept outlet 32 and/or combined with system accepts via accept outlet 34, depending upon the quality and production requirements. Rejects from secondary flotation cell 20 are transported to inlet 38 of water clarifier 22. Clarified water is transported from clarified water outlet 40 and used for dilution water within the plant. Contaminants are transported from sludge outlet 42 and disposed of as sludge.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for removing bleedthrough contaminants from old corrugated container fiber pulp, without the need to add chemicals to the pulp, said bleedthrough contaminants having an equivalent diameter of between about 80 $\mu$m to 750 $\mu$m, said system comprising:

a plurality of primary flotation cells structured and arranged to receive old corrugated container fiber pulp having the bleed through contaminants therein, each said primary flotation cell having an air injection device, an inlet, an accept outlet and a reject outlet, said inlets and said accept outlets of said plurality of primary flotation cells being coupled together in a series configuration for substantial removal of said contaminants and for passing pulp substantially free from said contaminants through a last of said accept outlets;

at least one secondary flotation cell including an upstream secondary flotation cell, said upstream secondary flotation cell having an inlet, at least one accept outlet and a reject outlet, said upstream secondary flotation cell inlet being fluidly coupled with said reject outlets of said primary flotation cells said at least one secondary flotation cell adapted and arranged for receiving old corrugated container fiber pulp having bleed through contaminants therein from said reject outlets of said primary flotation cells, and for passing from said at least one secondary flotation cell accept outlet old corrugated container fiber pulp substantially free from bleed through contaminants; and a water clarifier having an inlet connected with said reject outlet of said upstream secondary flotation cell.

2. The system of claim 1, said at least one secondary flotation cell including only said upstream secondary flotation cell, and said water clarifier inlet being directly connected with said reject outlet of said upstream secondary flotation cell.

3. The system of claim 2, said water clarifier including a clarified water outlet and a sludge outlet.

4. The system of claim 1, said reject outlets of said primary flotation cells being coupled together in parallel with said inlet of said upstream secondary flotation cell.

5. The system of claim 1, said plurality of primary flotation cells including an upstream primary flotation cell and a downstream primary flotation cell, said inlet of said upstream secondary flotation cell being coupled with at least one of said upstream primary flotation cell inlet and said downstream primary flotation cell accept outlet.

6. The system of claim 5, said inlet of said upstream secondary flotation cell being coupled with each of said upstream primary flotation cell inlet and said downstream primary flotation cell accept outlet.

7. The system of claim 1, said plurality of primary flotation cells consisting of three primary flotation cells.

8. A system for removing bleedthrough contaminants from old corrugated container fiber pulp, without the need to add chemicals to the pulp, said bleedthrough contaminants having an equivalent diameter of between about 80 $\mu$m to 750 $\mu$m, said system comprising:

a plurality of primary flotation cells structured and arranged to receive old corrugated container fiber pulp having the bleed through contaminants therein, each said primary flotation cell having an air injection device, an inlet, an accept outlet and a reject outlet, said inlets and said accept outlets of said plurality of primary flotation cells being coupled together in a series configuration for substantial removal of said contaminants and for passing pulp substantially free from said contaminants through a last of said accept outlets, said reject outlets being coupled together in parallel;

a secondary flotation cell having an inlet, at least one accept outlet and a reject outlet, said secondary flotation cell inlet being fluidly coupled with said reject outlets of said primary flotation cells for receiving from said primary flotation cells old corrugated container fiber pulp having bleed through contaminants therein, and for passing from said secondary flotation cell at least one accept outlet old corrugated container fiber pulp substantially free from bleed through contaminants; and a water clarifier having an inlet, a clarified water outlet and a sludge outlet, said inlet being connected with said reject outlet of said upstream secondary flotation cell.

9. The system of claim 8, said plurality of primary flotation cells consisting of three primary flotation cells.

10. The system of claim 8, said plurality of primary flotation cells including an upstream primary flotation cell and a downstream primary flotation cell, said inlet of said secondary flotation cell being coupled with at least one of said upstream primary flotation cell inlet and said downstream primary flotation cell accept outlet.

11. The system of claim 10, said inlet of said secondary flotation cell being coupled with each of said upstream primary flotation cell inlet and said downstream primary flotation cell accept outlet.

\* \* \* \* \*